(12) United States Patent
Rehr et al.

(10) Patent No.: US 12,535,127 B2
(45) Date of Patent: Jan. 27, 2026

(54) DRIVE DEVICE FOR A VEHICLE AXLE

(71) Applicant: AUDI AG, Ingolstadt (DE)

(72) Inventors: Alfred Rehr, Hepberg (DE); Tassilo Scholle, Gaimersheim (DE); Björn Kürten-Pachowsky, Eichstätt (DE); Kay-Uwe Henning, Dachau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/836,821

(22) PCT Filed: Feb. 9, 2023

(86) PCT No.: PCT/EP2023/053235
§ 371 (c)(1),
(2) Date: Aug. 8, 2024

(87) PCT Pub. No.: WO2023/156291
PCT Pub. Date: Aug. 24, 2023

(65) Prior Publication Data
US 2025/0137518 A1    May 1, 2025

(30) Foreign Application Priority Data
Feb. 17, 2022 (DE) ................ 10 2022 103 839.4

(51) Int. Cl.
*F16H 48/22* (2006.01)
*B60K 1/00* (2006.01)
(Continued)

(52) U.S. Cl.
CPC ............. *F16H 48/22* (2013.01); *F16H 48/32* (2013.01); *B60K 2001/001* (2013.01);
(Continued)

(58) Field of Classification Search
CPC .. F16H 48/22; F16H 48/32; F16H 2200/0021; B60T 1/062–067;
(Continued)

(56) References Cited

U.S. PATENT DOCUMENTS 2,961,057 A * 11/1960 Johnson ................. B62D 11/08
60/904
3,095,760 A *  7/1963 Schaefer ................ B62D 11/08
475/20
(Continued)

FOREIGN PATENT DOCUMENTS

DE    102005018907 A1    11/2006
DE    102009013293 A1     9/2010
(Continued)

OTHER PUBLICATIONS

International Search Report on Patentability issued on Apr. 11, 2023, in corresponding International Application No. PCT/EP2023/053235, 4 pages.
(Continued)

*Primary Examiner* — James J Taylor, II
(74) *Attorney, Agent, or Firm* — Maier & Maier, PLLC

(57) ABSTRACT

A drive device for a vehicle axle of a two-track vehicle, which has an axle differential, the input side of which is drivingly connected to an electric machine and the output sides of which drive on flange shafts leading to the two vehicle wheels. The vehicle axle has a superposition gear with a multi-disk clutch on each side of the vehicle, by which the electric machine can be connected directly to the vehicle wheel flange shaft by bridging the axle differential. The multi-disk clutches can be controlled by a control unit. On each side of the vehicle the multi-disk clutch is assigned a multi-disk brake acting as a vehicle wheel brake, by which
(Continued)

vehicle braking processes can be carried out alternatively or in addition to the multi-disk clutch.

11 Claims, 11 Drawing Sheets

(51) Int. Cl.
  *B60K 23/04* (2006.01)
  *B60T 1/06* (2006.01)
  *F16H 48/32* (2012.01)
  *F16H 48/36* (2012.01)
(52) U.S. Cl.
  CPC ......... *B60K 2023/043* (2013.01); *B60T 1/065* (2013.01); *F16H 2048/366* (2013.01)
(58) Field of Classification Search
  CPC .......... F16D 67/00; F16D 67/02; F16D 67/04; B60K 2023/043; B60K 23/08; B60K 1/00; B60K 1/02; B60K 2001/001; B62D 9/002; B62D 11/02; B62D 11/06; B62D 11/08; B62D 11/10; B62D 11/12; H02K 7/006; H02K 7/116; B60L 15/007; B60L 15/2036
  See application file for complete search history.

(56) References Cited

U.S. PATENT DOCUMENTS

| | | | | |
|---|---|---|---|---|
| 3,405,574 A | * | 10/1968 | Livezey | F16H 47/08 475/28 |
| 3,982,618 A | * | 9/1976 | Horsch | F16D 65/853 188/264 E |
| 4,328,876 A | * | 5/1982 | Horsch | B62D 11/18 60/436 |
| 4,997,412 A | * | 3/1991 | Reed | F16H 47/04 475/24 |
| 6,962,227 B1 | * | 11/2005 | Kirkwood | B60W 30/02 180/245 |
| 7,331,430 B2 | * | 2/2008 | Valvano | F16D 65/095 188/73.1 |
| 11,773,914 B2 | * | 10/2023 | Van Dingenen | F16D 13/72 192/70.27 |
| 2010/0240485 A1 | | 9/2010 | Strasser et al. | |

FOREIGN PATENT DOCUMENTS

| | | |
|---|---|---|
| DE | 102011108567 A1 | 1/2013 |
| DE | 102011114322 A1 | 3/2013 |
| DE | 102013004936 A1 | 9/2014 |
| DE | 102015112924 A1 | 2/2016 |
| DE | 102017124592 A1 | 5/2019 |
| DE | 102018133223 A1 | 6/2020 |
| DE | 102019115918 A1 * | 12/2020 |

OTHER PUBLICATIONS

Office Action issued Oct. 28, 2022, in corresponding German Application No. 102022103839.4, 8 pages.

* cited by examiner

DRIVE DEVICE FOR A VEHICLE AXLE

FIELD

The invention relates to a drive device for a vehicle axle of a two-track vehicle.

BACKGROUND

To increase efficiency and range, braking of an electrified vehicle is carried out by an electric drive in generator mode (hereinafter referred to as recuperation mode), provided that certain boundary conditions are met.

A generic drive device for a vehicle axle has an axle differential by means of which a 50/50 distribution can be carried out. Its input side is connected to an electric machine, while its output sides drive on flange shafts leading to the two vehicle wheels.

In the above state of the art, different braking torques cannot be set on the vehicle wheels in the recuperation mode. Therefore, braking torque redistribution is not available during recuperation mode. For safety reasons, the recuperation range is limited. If this range is left, recuperation is deactivated and the conventional vehicle braking system takes over. Accordingly, in the state of the art, driving dynamics control is carried out by means of a conventional vehicle braking system in which a control unit specifically controls the vehicle wheel brakes of the vehicle wheels with different braking torques in order to influence the driving behavior.

Therefore, no recuperation takes place while the braking torque redistribution is being carried out. Accordingly, the recuperation performance and thus the consumption or electric range are limited due to driving safety aspects.

Especially in sporty vehicles, a torque vectoring system is usually found on the rear axle. This directs drive torque past the differential directly to the vehicle wheels. This allows the drive torque to be freely distributed on the respective vehicle axle. In addition to the usual drive with differential, such a torque vectoring system also has two superposition gears, two force-controlled clutches, two actuators, a control unit and usually its own hydraulic system.

A differential gear with torque vectoring functionality is known from DE 10 2009 013 293 A1. From DE 10 2015 112 924 A1 a device for controlling a differential with slip limitation is known. A vehicle axle with electric drive motors is known from DE 10 2018 133 223 A1.

SUMMARY

The object of the invention is to provide a drive device for a vehicle axle of a two-track vehicle, in which the recuperation power during driving is increased compared to the prior art.

The invention is based on a drive device for a vehicle axle of a two-track vehicle, which has an axle differential. Its input side is connected to an electric machine, while its output sides drive on flange shafts leading to the two vehicle wheels. The vehicle axle has a superposition gear with a multi-disk clutch for each vehicle wheel. With the help of the superposition gear, the electric motor can be connected directly to the vehicle wheel flange shaft by bridging the axle differential. The generic electric machine can be operated in an engine operating mode during vehicle acceleration and in a recuperation operating mode during vehicle deceleration.

According to the invention, a braking torque redistribution between the two vehicle wheels can be carried out during the recuperation mode. During braking torque redistribution, a braking torque path running between the vehicle wheel and the electric machine can be divided by controlling the respective multi-disk clutch, namely into a differential braking torque path that carries a differential braking torque from the vehicle wheel via the axle differential to the electric machine, and into a superposition braking torque path that carries a superposition braking torque from the vehicle wheel past the axle differential via the superposition gear to the electric machine. In this way, in recuperation mode, the vehicle wheels can be subjected to different braking torques, so that the vehicle wheels can brake with different strengths.

If the vehicle axle is designed without vehicle wheel brakes, it is necessary that recuperation always works sufficiently. This means that emergency braking or a downhill descent must be safe even when the battery is fully charged. The braking function is subject to a high safety rating. The drive must be developed according to these requirements.

Against this background, according to the characterizing part of claim 1, a multi-disk brake acting as a vehicle wheel brake is assigned to the multi-disk clutch on each side of the vehicle. The multi-disk brake can be used to brake the vehicle as an alternative to or in addition to the multi-disk clutch. Therefore, if the electric motor is not or only partially able to recuperate, the multi-disk brake can take over the braking task at least partially or completely.

The braking effect of the multi-disk clutch depends on the current operating state of the electric machine. The multi-disk brake, for example, can cause braking depending on the current recuperation capacity.

In a design variant that is easy to implement in terms of control technology and has a reduced number of components, both the multi-disk clutch and the multi-disk brake can be operated via a common hydraulic cylinder on each side of the vehicle. The common hydraulic cylinder is in turn connected to the control unit via exactly one hydraulic line. If the control unit controls the hydraulic cylinder with a brake pressure, a hydraulic pressure builds up in the hydraulic cylinder, with which an ring piston presses against both a plate pack of the multi-disk clutch and against a plate pack of the multi-disk brake.

Starting from the non-actuated state, the ring piston presses the disk pack of the multi-disk clutch against an axial stop via a multi-disk clutch clearance until the kiss point is reached. The multi-disk clutch clearance is preferably unchangeable regardless of the current braking situation, i.e. whether braking is uniform or uneven on each side of the vehicle.

In the same way, starting from the non-actuated state, the ring piston presses the disk pack of the multi-disk brake against an axial stop via a multi-disk brake clearance until the kiss point is reached. In contrast to the multi-disk clutch, the multi-disk brake clearance can be varied depending on the current braking situation. The variation of the multi-disk brake clearance is carried out in a structurally simple manner, preferably by axial adjustment of the multi-disk brake stop.

When braking is carried out evenly on both sides of the vehicle, it is preferable for safety reasons if the braking intervention is primarily carried out by the multi-disk brake. In contrast, in the case of uneven braking on both sides of the vehicle, it is preferable for the multi-disk clutch to primarily take over the braking intervention in order to enable recuperation. Against this background, the multi-disk brake clearance can be varied as follows: with uniform braking on both sides of the vehicle, the multi-disk brake clearance can be smaller than the multi-disk clutch clearance. As a result, during the closing stroke of the ring piston, the multi-disk brake comes into braking engagement first and only later does the multi-disk clutch come into braking engagement.

In contrast, in the case of uneven braking on both sides of the vehicle, the multi-disk brake clearance is larger than the multi-disk clutch clearance. As a result, during the closing stroke of the ring piston, the multi-disk clutch on the side of the vehicle controlled by the control unit with the higher brake pressure is the first to come into braking engagement. Only later does the multi-disk brake also come into braking intervention.

The multi-disk brake clearance or the brake characteristic curve of the multi-disk brake can preferably be varied as follows: The axially adjustable stop of the multi-disk brake can be designed as a pressure rod. The pressure rod acts as an axially adjustable axial stop on both sides of the vehicle. For this purpose, the pressure rod can be axially adjusted between movement stops by a pressure rod axial travel.

When the pressure rod is used, the following situation arises in the event of uneven braking: On the side of the vehicle subjected to greater brake pressure, the disk pack of the multi-disk brake and, accordingly, the pressure rod are adjusted by the pressure rod axial travel in the direction of the other side of the vehicle during the closing stroke of the ring piston. On the side of the vehicle subjected to greater brake pressure, the available multi-disk brake clearance is therefore increased by the pressure rod axial travel, compared to the braking case with uniform braking. Preferably, the multi-disk brake clearance is dimensioned one additional dimension larger than the multi-disk clutch clearance. This ensures that during the braking process the multi-disk clutch comes into braking engagement first and only then does the multi-disk brake come into braking engagement.

On the side of the vehicle with counterpressure, which is opposite the side of the vehicle subjected to greater brake pressure, the following situation arises in the event of uneven braking: The multi-disk brake clearance is reduced due to the pressure rod adjustment. Preferably, the reduced multi-disk brake clearance is dimensioned to be smaller than the multi-disk clutch clearance so that actuation of the multi-disk clutch on the counterpressure side of the vehicle is excluded.

The vehicle axle can also have a separating clutch on each side of the vehicle. When the clutch is open, the wheel on one side of the vehicle can rotate freely. Its speed correlates with the current vehicle speed, which forms a reference value on the basis of which a control unit carries out a driving dynamics control function, such as an ABS function. With the invention, the recuperation operating mode can be maintained during the execution of the driving dynamics control function, so that recuperation energy can also be obtained during the execution of the driving dynamics control function.

In a technical implementation, during the execution of the driving dynamics control function (i.e. during the detection of the speed of the freely rotating vehicle wheel), the vehicle wheel located on the other side of the vehicle can transmit a braking torque to the electric machine via the superposition gear. This means that the driving dynamics control function can be carried out simultaneously with the recuperation mode.

The separating clutch can divide the flange shaft on each side of the vehicle into a differential-side partial shaft and a wheel-side partial shaft. The superposition gear is preferably completely decoupled from the differential-side partial shaft, but can be coupled to the wheel-side partial shaft via the multi-disk clutch. When the clutch is open, the axle differential is thus switched to a load-free state, whereby the differential braking torque path is interrupted and braking torque transmission from the vehicle wheel is only possible via the superposition gear to the electric machine.

It is structurally simple if the separating clutch is implemented as a claw clutch with a sliding sleeve. This can be axially adjustable between an open position and a closed position. In the closed position, a sliding sleeve internal toothing can mesh with external toothings of both the differential-side partial shaft and the wheel-side partial shaft. In contrast, in the open position the tooth engagement is released so that no torque transmission is possible. The sliding sleeve can be assigned a spring by means of which the sliding sleeve can be preloaded in the direction of the closed position with a spring preload force.

In order to ensure simple control and reduced component number, the multi-disk clutch, the multi-disk brake and the separating clutch on each side of the vehicle can be controlled by the control unit using a common hydraulic line. Preferably, the hydraulic cylinder which actuates the multi-disk clutch and the multi-disk brake can also actuate the separating clutch.

During normal operation, i.e. no ABS intervention, the two claw clutches of the vehicle axle are closed. When braking torque is transmitted via the closed claw clutch, the mutually facing tooth flanks of the sliding sleeve internal toothing and the external toothing of the differential-side partial shaft are in pressure contact. To ensure the closed position, it is preferred if the tooth flanks have inclined backings. With the help of the backings, an axial force component builds up under braking torque effect, which pushes the sliding sleeve towards the closed position. The magnitude of the axial force component acting on the sliding sleeve correlates with the magnitude of the braking torque flowing through the separating clutch. This means that as the braking torque decreases, the axial force component also decreases, while as the braking torque increases, the axial force component also increases.

In the following, an operating situation occurring during recuperation mode is considered in which the multi-disk clutch is opened on one non-actuated side of the vehicle and the multi-disk clutch is actuated on the other, actuated side of the vehicle. In this case, increased braking torque flows from the vehicle wheel to the electric motor on the actuated side of the vehicle, while only reduced braking torque flows from the vehicle wheel to the electric motor on the non-actuated side of the vehicle. There is therefore a risk that the vehicle wheel on the non-actuated side of the vehicle will lock if the reduced braking torque flowing through the closed claw clutch falls below a braking torque limit value. In this case, a driving dynamics control function, such as ABS, must be activated, which opens one of the claw clutches for safety reasons. In this way, the axle differential is switched load-free. This allows the vehicle wheel on the non-actuated side of the vehicle to rotate freely, the speed of which correlates with the current vehicle speed, which forms a reference value on the basis of which the control unit performs the driving dynamics control function (ABS function).

The opening of the claw clutch in the case of ABS can be carried out simply and automatically in terms of control technology as follows: Accordingly, the forces acting on the sliding sleeve, i.e. spring preload force, actuator force and axial force component, are designed in such a way that a resulting force moves the sliding sleeve into the open position, provided that the axial force component falls below an axial force limit value that correlates with the braking torque limit value due to a decreasing braking torque.

With the invention, conventional, hydraulically operated vehicle wheel brakes can be omitted from the vehicle axle. In this case, braking of the vehicle wheels can be carried out solely by controlling the two multi-disk clutches.

Preferably, each of the two superposition gears can have a loose gear rotatably mounted on the flange shaft. The idler gear can be drivingly connected to the electric machine. In addition, the idler gear can be coupled to the flange shaft via the multi-disk clutch. The gear ratio between the electric motor and the idler gear can preferably be designed to be somewhat shorter than the gear ratio between the electric motor and the differential input side. In this way, the idler gear rotates slightly slower than the flange shaft. This ensures a flow of braking torque from the flange shaft via the multi-disk clutch towards the electric machine.

In addition, the input-side axle differential gear can mesh with a fixed gear arranged on an intermediate shaft. In this case, the superposition gear can have a fixed gear arranged on the intermediate shaft, which meshes with the idler gear.

In the transmission structure outlined above, the multi-disk clutch can be actuated on one side of the vehicle. In this case, a braking torque split can occur in which the braking torque coming from the vehicle wheel is divided into the reduced differential braking torque and the superimposed braking torque. As the torque continues to flow towards the electric motor, the superimposed braking torque is introduced into the intermediate shaft at the intermediate shaft fixed gear. The intermediate shaft therefore acts as a summing shaft in which the superimposed braking torque and the differential braking torque are added together. In contrast, on the non-actuated side of the vehicle, the vehicle wheel takes on the differential braking torque of the actuated side of the vehicle via the axle differential, which is then passed to the intermediate shaft via the axle differential and added there.

The multi-disk clutches of the two superposition gears can preferably be integrated into a driving dynamics control system. In this case, during recuperation mode, a control unit can control one or both of the multi-disk clutches depending on current driving parameters in order to support driving behavior by redistributing braking torque.

BRIEF DESCRIPTION OF THE FIGURES

An exemplary embodiment of the invention is described below by means of the appended figures. In particular.

DETAILED DESCRIPTION

Figure 1:
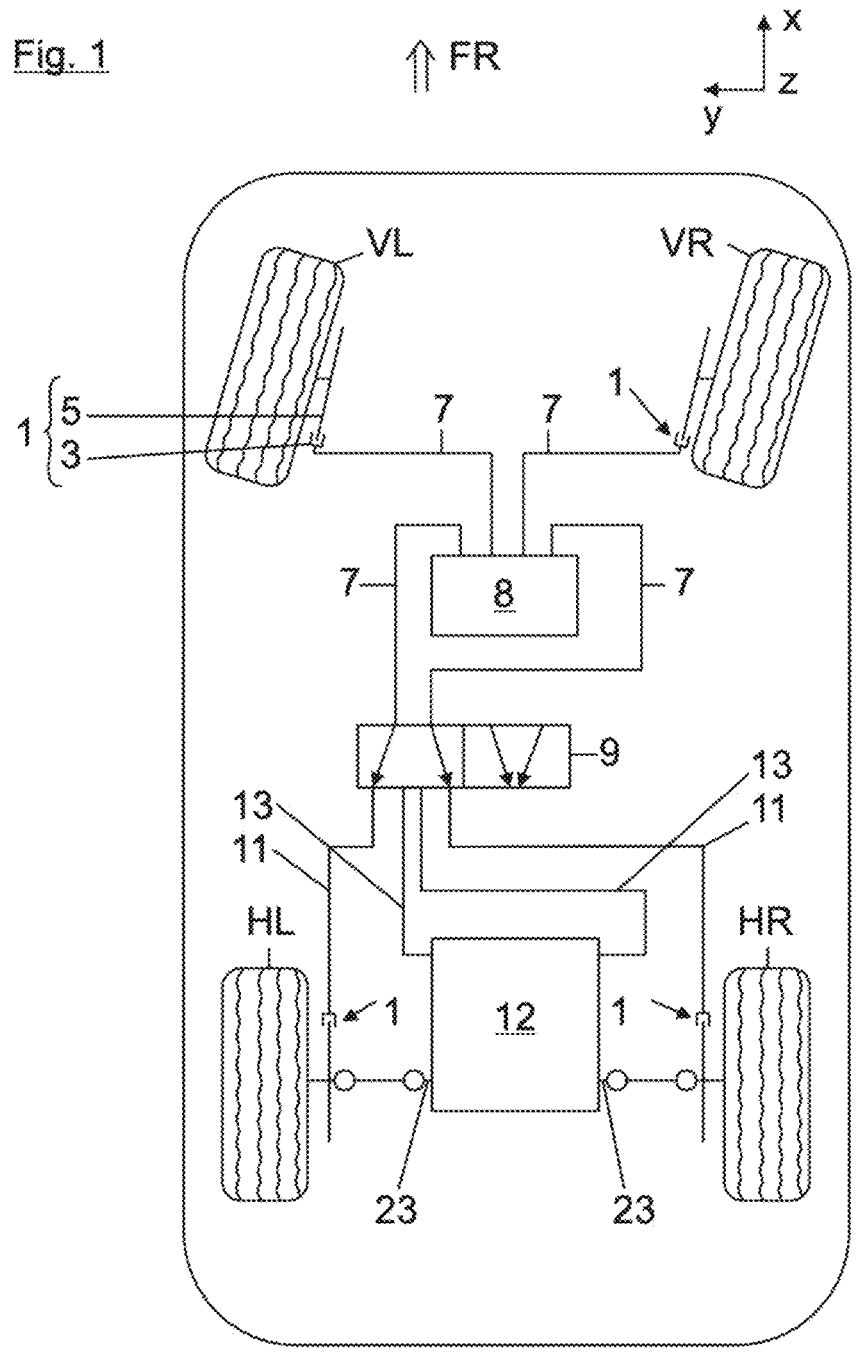
FIG. 1 is a view of a first comparative example of a drive device for a vehicle axle not covered by the invention.

In order to facilitate understanding of the invention, a comparative example not covered by the invention will first be described with reference to FIGS. 1 to 4. FIG. 1 shows a rough schematic of a drive device for a two-track vehicle with an electrified rear axle. The drive device is shown in FIG. 1 only to the extent that it is necessary for understanding the invention. Accordingly, both the front wheels VR, VL and the rear wheels HR, HL of the vehicle each have a vehicle wheel brake 1. Each of the vehicle wheel brakes 1 is constructed from a brake caliper 3 that can be actuated via a hydraulic cylinder (not shown) and a brake disk 5. The hydraulic cylinders of the vehicle wheel brakes 1 are each connected to a control unit 8 via hydraulic lines 7. The control unit 8 can apply brake pressure to the hydraulic cylinder of a vehicle brake 1 via a corresponding hydraulic line 7, whereby the brake caliper 3 with its brake pads comes into pressure contact with the brake disk 5. In FIG. 1, the two hydraulic lines 7 leading to the rear of the vehicle are routed to a hydraulic valve 9. The hydraulic valve 9 forms a branching point. At the hydraulic valve 9, the hydraulic line 7 on the left side of the vehicle branches off into a partial line 11 to the left rear vehicle brake 1 and into a partial line 13 which leads to a drive unit 12 of the vehicle's rear axle. In the same way, at the hydraulic valve 9, the hydraulic line 7 on the right side of the vehicle branches off into a partial line 11 to the right rear vehicle brake 1 and into a partial line 13, which also leads to the drive unit 12 of the vehicle's rear axle. According to FIG. 2, the drive unit 12 has an electric machine EM, which drives the rear wheels HR, HL via a transmission 14.

Each of the two partial lines 13 leads from the hydraulic valve 9 to a multi-disk clutch actuator 15 (FIG. 2) of a multi-disk clutch 19, designed as a hydraulic cylinder 15. The two multi-disk clutches 19 are part of the transmission 14 of the vehicle's rear axle, the transmission structure of which is described later. According to FIG. 1, the hydraulic valve 9 can be switched into two positions. In the switching position shown, the hydraulic lines 7 are fluidically connected to the partial lines 11 leading to the respective rear vehicle wheel brakes 1, while the hydraulic cylinders 15 of the two multi-disk clutches 19 are fluidically decoupled from the control unit 8. In contrast, in the second switching position (not shown), the two hydraulic lines 7 are each fluidically connected to the partial lines 13, via which the hydraulic cylinders 15 of the multi-disk clutches 19 can be controlled by the control unit 8.

Figure 2:
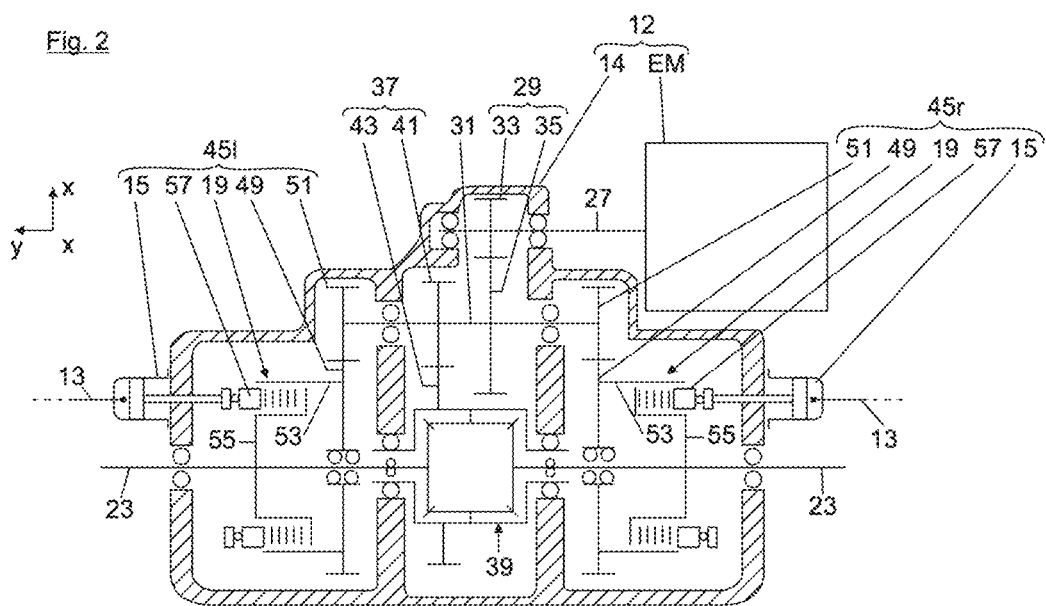
FIG. 2 is another view of a first comparative example of a drive device for a vehicle axle not covered by the invention.

As can be seen from FIG. 2, the electric machine EM of the electrified rear axle of the vehicle is installed transversely, so that the electric machine EM is arranged axially parallel to the flange shafts 23 leading to the vehicle wheels HR, HL.

The electric machine shaft 27 is connected via a countershaft spur gear stage 29 to an intermediate shaft 31, which is constructed from a fixed gear 33 arranged on the electric machine shaft 27 and a fixed gear 35 meshing therewith and arranged on the intermediate shaft 31. The intermediate shaft 31 is connected to the input side of an axle differential 39 via a further spur gear stage 37, which is constructed from a fixed gear 41 arranged on the intermediate shaft 31 and an axle differential gear 43 on the input side. The axle differential 39 drives in the vehicle transverse direction y on both sides onto the two flange shafts 23 leading to the vehicle wheels HL, HR.

As can be seen from FIG. 2, the rear axle has a superposition gear 45 on each side of the vehicle, by means of which the electric machine EM can be connected directly to the respective flange shaft 23 by bridging the axle differential 39. The two superposition gears 45 are designed as mirror images with respect to a vehicle center longitudinal plane. Each of the two superposition gears 45 has a loose gear 49 which is rotatably mounted on the flange shaft 23 and which meshes with the intermediate shaft fixed gear 51. An outer disk carrier 53 of the multi-disk clutch 19 is formed on the respective idler gear 49 and interacts with an inner disk carrier 55 formed on the flange shaft 23. The disk pack located between the outer disk carrier 53 and the inner disk carrier 55 can be pressed together by an ring piston 57, which can be adjusted by a horizontal stroke by means of the hydraulic cylinder 15 in order to actuate the multi-disk clutch 19 up to a predetermined degree of clutch. The two multi-disk clutches 19 are power-shiftable and controllable with slip.

During recuperation mode, the electric machine EM is operated in generator mode, in which the two vehicle wheels HL, HR transmit a braking torque $M_L$ and $M_B$ via the flange shafts 22, 25 in the direction of the axle differential 39. In the axle differential 39, the two braking torques $M_L$ and $M_B$ are added together to form a total braking torque, which is then passed on to the electric machine EM, which operates as a generator.

A braking torque redistribution during the recuperation mode is carried out as follows: The control unit 8 switches the hydraulic valve 9 into its second switching position (not shown). As a result, the control unit 8 is connected via the partial line 13 on the right-hand side of the vehicle to the hydraulic cylinder 15 of the multi-disk clutch 19 arranged on the right-hand side of the vehicle. As a result, the control unit 8 is connected via the partial line 13 on the right-hand side of the vehicle to the hydraulic cylinder 15 of the multi-disk clutch 19 arranged on the right-hand side of the vehicle. In contrast, the rear vehicle brakes 1 cannot be controlled and are therefore deactivated. By hydraulically controlling one of the multi-disk clutches 19, a braking torque path is divided into a differential braking torque path, which transmits a differential braking torque $M_2$ from the respective vehicle wheel via the axle differential 39 to the electric machine EM, and into a superposition braking torque path, which transmits a superposition braking torque $M_1$ from the respective vehicle wheel past the axle differential 39 via the superposition gear 45 to the electric machine EM.

Figure 3:
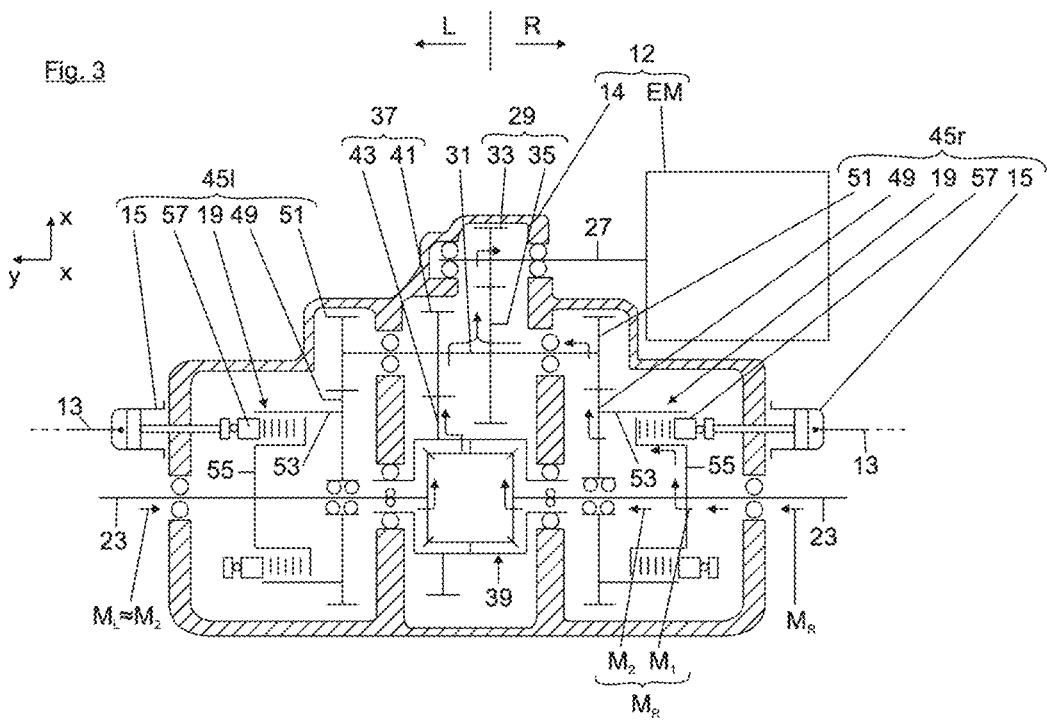
FIG. 3 is another view of a first comparative example of a drive device for a vehicle axle not covered by the invention.

For example, in FIG. 3 the electric machine EM is in the recuperation mode, while at the same time a braking torque redistribution takes place in which the right-hand multi-disk clutch 19 is not completely closed, but only up to a certain degree of clutch engagement that allows slip. The left multi-disk clutch 19, however, is completely open. According to FIG. 3, the braking torque $M_R$ applied to the right rear wheel HR is divided at the right multi-disk clutch 19 into a differential torque $M_2$ leading to the axle differential 39 and into a superposition torque $M_1$ which is passed via the multi-disk clutch 19 to the intermediate shaft 31. The left rear wheel HL receives the differential torque $M_2$ of the right side of the vehicle via the axle differential 39. Therefore, the differential torque $M_2$ from the left rear wheel HL and the differential torque $M_2$ from the right rear wheel HL are transmitted via the axle differential 39 to the intermediate shaft 31. In addition, the superposition torque $M_1$ is transmitted from the right rear wheel HR via the superposition gear 45 of the right, actuated vehicle side to the intermediate shaft 31. The intermediate shaft 31 acts as a summing shaft at which all braking torques are added up to form a total braking torque, which is transmitted via the countershaft stage 29 to the electric machine EM and is recuperated there.

In order to ensure a braking torque flow from the flange shaft 23 via the switched multi-disk clutch 19 in the direction of the electric machine EM, it is relevant that there is a speed difference between the flange shaft 23 and the idler gear 49, at which the idler gear 49 rotates somewhat slower than the flange shaft 23. The gear ratio between the electric machine EM and the idler gear 49 is therefore designed to be somewhat shorter than the gear ratio between the electric machine EM and the differential input side.

As soon as the control unit 8 detects an emergency situation during the recuperation mode and/or ABS/8 intervention is to take place, the control unit 8 ends the recuperation mode. In this case, the control unit 8 adjusts the hydraulic valve 9 to the switching position shown in FIG. 1, whereby the driving dynamics control during further driving is carried out solely with the aid of the rear vehicle wheel brakes 1, while the multi-disk clutches 19 can no longer be controlled.

Figure 4:
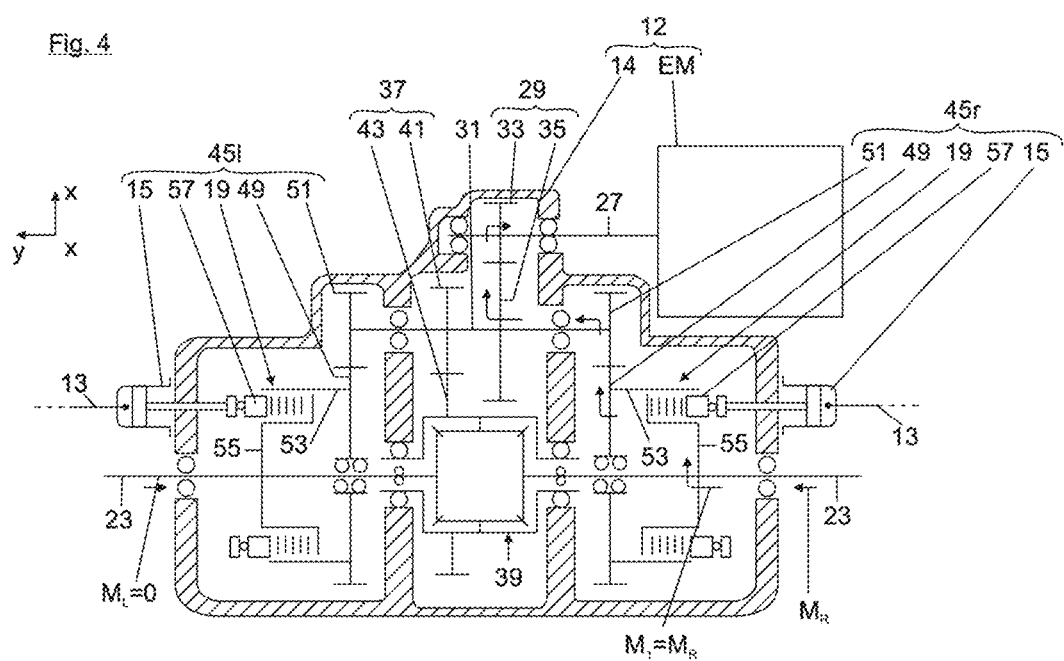
FIG. 4 is another view of a first comparative example of a drive device for a vehicle axle not covered by the invention.

FIG. 4 shows another operating situation during recuperation mode. Accordingly, the right multi-disk clutch 19 is completely closed. The left multi-disk clutch 19, however, is completely open. Thus, in FIG. 4, the braking torque $M_R$ applied to the right rear wheel HR is completely transmitted via the multi-disk clutch 19 to the intermediate shaft 31. From there, the braking torque is transmitted via the countershaft stage 29 to the electric machine EM, where recuperation takes place. The left rear wheel HL, on the other hand, rotates without load at a speed which is imposed by the axle differential 31.

In the above comparative example, the following condition must be met for an ABS function to be carried out on the vehicle axle: At least one vehicle wheel HL, HR of the vehicle axle must rotate freely so that a sensor-detectable reference speed $n_{ref}$ can be set, which correlates with the current vehicle speed, which forms a reference value for the control unit 8, on the basis of which the control unit 8 controls the ABS function. When the ABS function is activated, the control unit 8 adjusts the braking torques acting on the remaining three vehicle wheels. The drive device according to the comparative example (FIGS. 1 to 4) is not ABS-compatible during recuperation mode, since no freely rotating vehicle wheel HL, HR can be set on the vehicle axle in recuperation mode. When the multi-disk clutch 19 is completely closed on the actuated side of the vehicle, i.e. without slip, the vehicle wheel on the other, non-actuated side of the vehicle can be switched without load (see the operating state according to FIG. 4). However, during recuperation mode, the load-free vehicle wheel is imposed a speed via the axle differential 39 that does not correlate with the current vehicle speed and is therefore not suitable as a reference value for the ABS function. In order to achieve free rotation of a vehicle wheel in the comparative example, the recuperation mode of the electric machine EM would have to be deactivated so that the electric machine EM rotates freely, whereby the axle differential 39 is switched to a load-free state. In this case, however, no recuperation energy can be obtained while the ABS function is being carried out.

In contrast, FIGS. 5 to 9 show a second comparative example not covered by the invention, which is designed in such a way that the recuperation operating mode can be maintained even while the ABS function is being carried out, so that recuperation energy can also be obtained while the ABS function is being carried out.

For this purpose, the vehicle axle has a separating clutch implemented as a claw clutch 58 on both sides of the vehicle. The claw clutch 58 divides the flange shaft 23 on each side of the vehicle into a differential-side partial shaft 59 and a wheel-side partial shaft 61. The inner disk carrier 55 of the respective multi-disk clutch 19 is arranged in a rotationally fixed manner on the wheel-carrier-side partial shaft 61. Accordingly, the superposition gear 45 can be coupled to the wheel-side partial shaft 61 via the multi-disk clutch 19, while the differential-side partial shaft 59 is not connected to the superposition gear 45. If one of the two claw clutches 57 is open, the axle differential 39 is thus switched to a load-free state, whereby the differential braking torque path is interrupted and braking torque transmission from the vehicle wheel is only possible via the superposition gear 45 to the electric machine EM.

Figure 7:
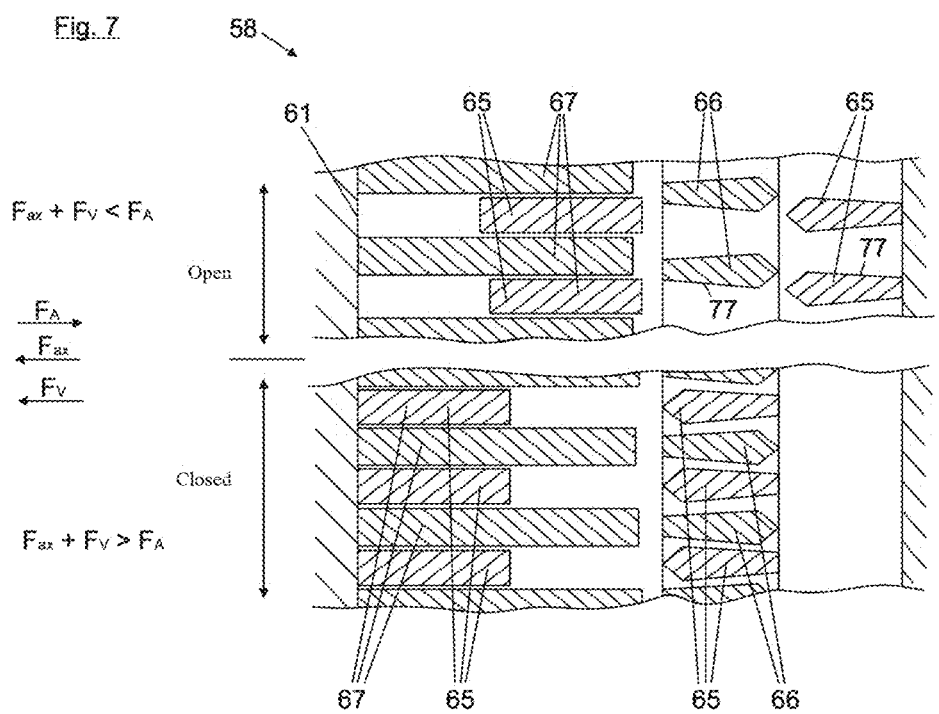
FIG. 7 is another view of a second comparative example not covered by the invention.

The claw clutch 58 has a sliding sleeve 63 which is axially adjustable between an open position and a closed position. In FIG. 7, the claw clutch 58 is schematically shown in an unwound view both in the open position ("open") and in closed position ("closed"). In the closed position, a sliding sleeve internal toothing 65 is in mesh with the external toothings 66, 67 of the differential-side partial shaft 59 and the wheel-side partial shaft 61. In contrast, in the open position the tooth engagement is released so that no torque is transmitted via the claw clutch 58. The sliding sleeve 63 of the claw clutch 58 is assigned a preload spring 69, by means of which the sliding sleeve 63 is preloaded in the direction of the closed position with a spring preload force $F_V$ (FIG. 7).

Figure 5:
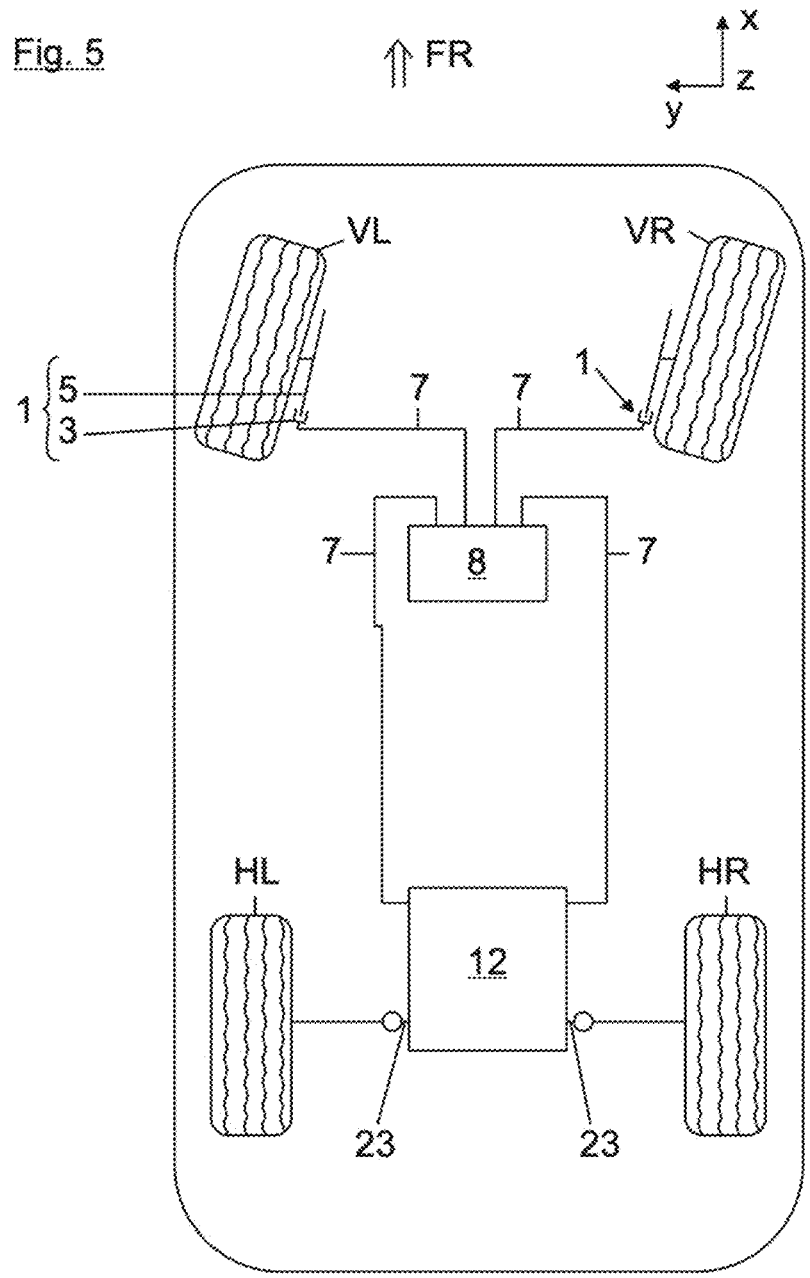
FIG. 5 is a view of a second comparative example not covered by the invention.
Figure 6:
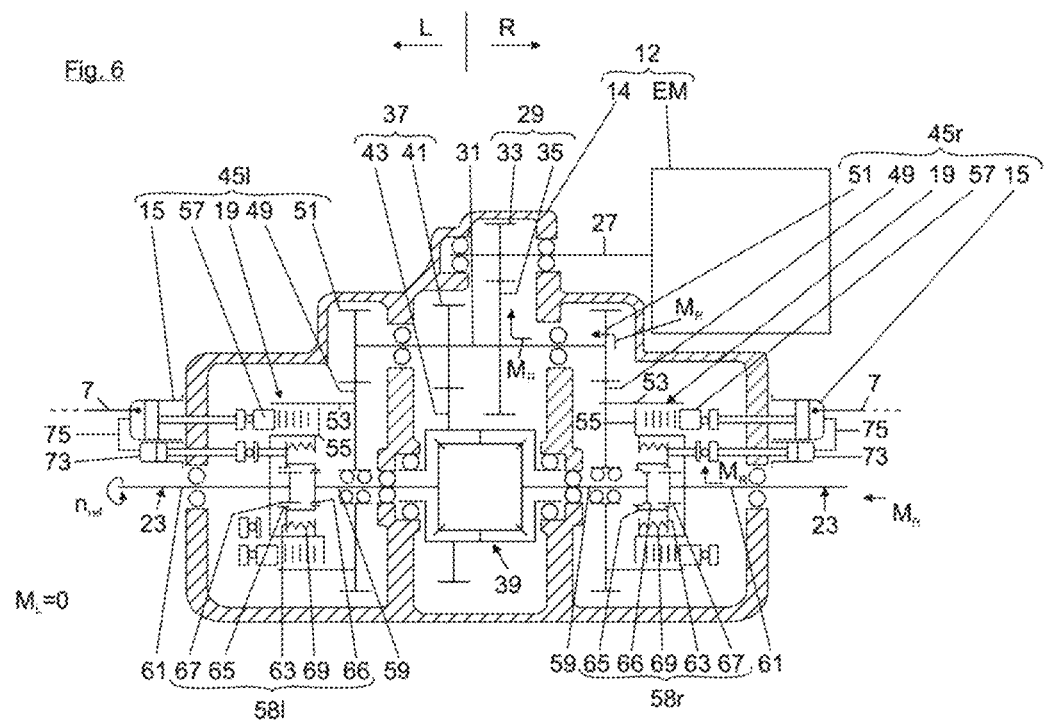
FIG. 6 is another view of a second comparative example not covered by the invention.

According to FIG. 6, both the multi-disk clutch actuator 15 and the sliding sleeve actuator 73 are realized as hydraulic cylinders, which are connected to the control unit 8 on each side of the vehicle via a common hydraulic line 7, as shown in FIG. 5. The common hydraulic line 7 is directly connected to the multi-disk clutch actuator 15 in a pressure-transmitting manner. The multi-disk clutch actuator 15 is in turn connected to the sliding sleeve actuator 73 in a pressure-transmitting manner via a connecting line 75. When activated by the control unit 8, a hydraulic pressure is built up in the multi-disk clutch actuator 15, with which the ring piston 57 presses against a plate pack of the multi-disk clutch 19 in order to close the multi-disk clutch 19 up to a predetermined degree of clutch engagement. The ring piston 57 also presses against the disk pack of the multi-disk brake 81. In the same way, a hydraulic pressure is built up in the sliding sleeve actuator 73, with which the sliding sleeve 63 is subjected to an actuator force $F_A$ acting in the direction of the open position.

As can be seen from the view shown in FIG. 7, in the closed position the mutually facing tooth flanks 77 of the sliding sleeve internal toothing 65 and the external toothing 66 of the differential-side partial shaft 59 are in pressure contact. The tooth flanks 77 have inclined backings so that under braking torque the sliding sleeve 63 is subjected to an axial force component $F_{ax}$ acting in the direction of the closed position. The magnitude of the axial force component $F_{ax}$ correlates with the magnitude of the braking torque to be transmitted, as can be seen from FIGS. 8 and 9. This means that as the braking torque decreases, the axial force component $F_{ax}$ also decreases, while as the braking torque increases, the axial force component $F_{ax}$ also increases. In FIG. 7, the directions of action of the forces acting on the sliding sleeve 63 are shown, namely the axial force component $F_{ax}$, the preload force $F_V$ of the preload spring 69 and the actuator force $F_A$ of the sliding sleeve actuator 73. In the lower half of the development (FIG. 7), the sum of the axial force component $F_{ax}$ and the preload force $F_V$ is greater than the actuator force $F_A$, so that the claw clutch 58 remains closed. In contrast, in the upper half of the development (FIG. 7), the sum of the axial force component $F_{ax}$ and the preload force $F_V$ is smaller than the actuator force $F_A$, so that the claw clutch 58 is closed.

Figure 8:
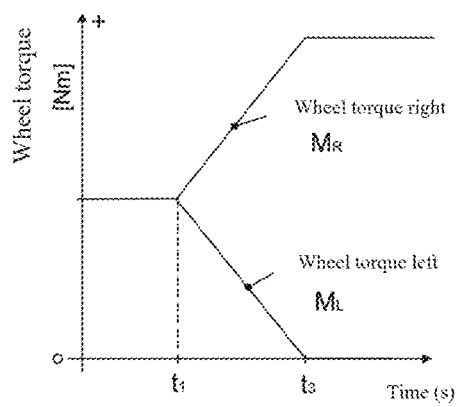
FIG. 8 is another view of a second comparative example not covered by the invention.
Figure 9:
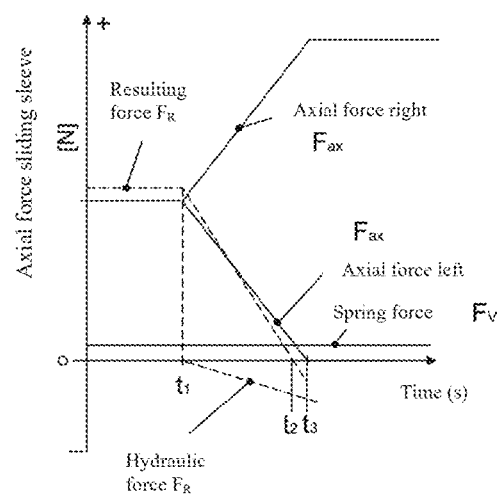
FIG. 9 is another view of a second comparative example not covered by the invention.

The following describes an operating situation during recuperation mode using FIGS. 8 and 9. The diagram in FIG. 8 shows the braking torques generated during this operating situation. The forces acting on the sliding sleeve 63 are shown in the diagram in FIG. 9. Until time $t_1$, the claw clutches 58 are closed and the multi-disk clutches 19 are opened on both sides of the vehicle. This results in an even distribution of braking torques, with the braking torques $M_L$, $M_R$ being equal on both sides of the vehicle. The two braking torques $M_L$, $M_R$ are combined at the axle differential 39 to form a total torque which is directed towards the electric machine EM.

From time $t_1$ onwards, a braking torque redistribution takes place as shown in FIG. 8, in which the multi-disk clutch 19 on the right-hand side of the vehicle is actuated, while the multi-disk clutch 19 on the left-hand side of the vehicle remains open. The two claw clutches 58 are still closed. As a result, the braking torque $M_R$ that can be applied on the right-hand side of the vehicle increases, which is composed of a differential braking torque $M_2$ guided via the axle differential 39 and a superposition braking torque $M_1$ guided via the right-hand superposition gear 45. The braking torque $M_L$ that can be applied on the left side of the vehicle takes on the value of the reduced differential braking torque $M_2$ on the right side of the vehicle.

When the time $t_3$ is reached, the braking torque $M_L$ that can be applied on the left side of the vehicle approaches the zero mark in FIG. 8. In this case, there is a risk that the vehicle wheel HL on the left side of the vehicle will block. For safety reasons, the vehicle dynamics control function (ABS function) is therefore activated to prevent such a vehicle wheel lock. To activate the driving dynamics control function, one of the claw clutches 58 must be opened so that the speed $n_{ref}$ (FIG. 6) of a freely rotating vehicle wheel is set as a reference value for the driving dynamics control function.

Such an opening of the claw clutch 58 is achieved in a simple and automatic manner in terms of control technology as follows: The opening process of the right claw clutch 58 takes place using the forces acting on the sliding sleeve 63, namely axial force component $F_{ax}$, spring preload force $F_V$ and actuator force $F_A$. These are designed in such a way that a resulting force $F_R$ (FIG. 9) only moves the sliding sleeve 63 into the open position when the axial force component $F_{ax}$ falls below an axial force limit value due to a decreasing braking torque $M_2$. This occurs in FIG. 9 at time $t_2$, at which hardly any braking torque $M_L$ can be applied to the left vehicle wheel HL and therefore there is a risk of the vehicle wheel locking.

In FIG. 6, the ABS function is activated, as an example, on the left, non-actuated side of the vehicle. The resulting braking torques are entered. Accordingly, the braking torque $M_R$ that can be applied on the right-hand side of the vehicle is transmitted to the electric machine EM via the closed multi-disk clutch 19. The left claw clutch 58 is closed while the left multi-disk clutch 19 is open. The right claw clutch 58 is opened due to the force acting on the sliding sleeve 63. As a result, the right output side of the axle differential 39 is switched to a load-free state. The vehicle wheel HL on the left side of the vehicle therefore rotates freely, so that a reference speed $n_{ref}$ is established which correlates with the actual vehicle speed.

Figure 10:
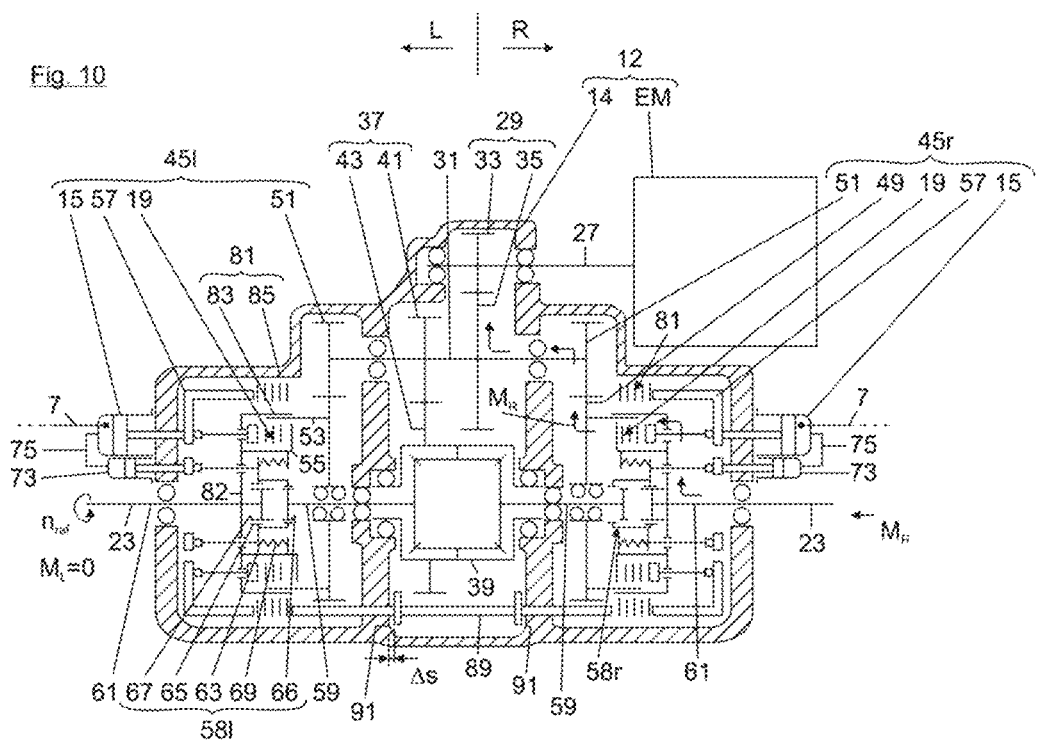
FIG. 10 shows a view corresponding to FIG. 6 of an exemplary embodiment of the invention.

FIG. 10 shows an exemplary embodiment of the invention, the basic structure and mode of operation of which are essentially identical to those in the previous comparative example. In contrast to the comparative example of FIGS. 5 to 9, in the embodiment of FIG. 10, a multi-disk brake 81 acting as a vehicle wheel brake is additionally arranged on each side of the vehicle. The inner disk carrier 83 of the multi-disk brake 81 is firmly connected to the flange shaft 23 via a radial connecting flange 82.

The multi-disk brake 81 has a disk pack which is arranged between an inner disk carrier 83 and an outer disk carrier 85. The disk pack of the multi-disk brake 81 and the disk pack of the multi-disk clutch 19 can be actuated on each side of the vehicle via the hydraulic cylinder 15 (namely the multi-disk clutch actuator). During vehicle braking, the control unit 8 controls one or both hydraulic cylinders 15 with a braking pressure. As a result, hydraulic pressure builds up in the respective hydraulic cylinder 15, with which the ring piston 57 is moved by a closing stroke and presses both against the disk pack of the multi-disk clutch 19 and against the disk pack of the multi-disk brake 81.

Starting from the non-actuated state, the ring piston 57 presses the disk pack of the multi-disk clutch 19 through a multi-disk clutch clearance $s_K$ until the kiss point is reached against an axial stop 87 (FIG. 10), which is fixed axially non-adjustably to the inner disk carrier 55 of the multi-disk clutch 19. At the same time, the ring piston 57 presses the disk pack of the multi-disk brake 81 against a pressure rod 89 through a multi-disk brake clearance $s_B$ until the kiss point is reached. This acts on both sides of the vehicle as an axially adjustable axial stop against which the disk pack of the respective multi-disk brake 81 is pressed. The pressure rod 89 is axially adjustable between movement stops 91 by a pressure rod axial travel Δs (FIG. 10).

In the following, a uniform braking is described with reference to FIG. 11, in which the control unit 8 applies the same braking pressure to the hydraulic cylinders 15 on both sides of the vehicle. In this case, the pressure rod 89 remains centered, that is, stationary without displacement to the left or to the right. According to FIG. 11, the multi-disk brake clearance $s_B$ is smaller than the multi-disk clutch clearance $s_K$ on both sides of the vehicle. As a result, during the closing stroke of the ring piston 57, the multi-disk brake 81 comes into braking engagement first and only later does the multi-disk clutch 19 come into braking engagement.

Figure 11:
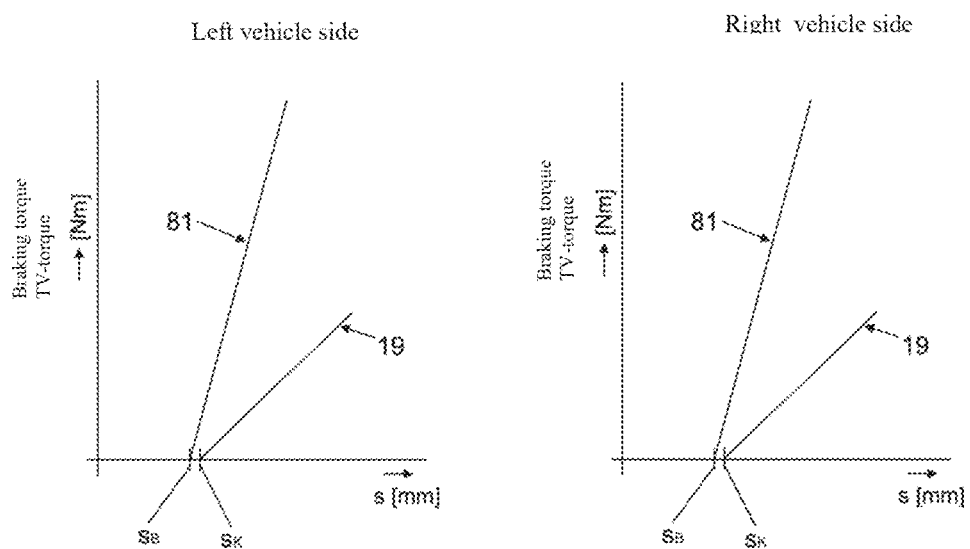
FIG. 11 shows braking characteristics of the multi-disk clutch and the multi-disk brake on both sides of the vehicle during uniform braking.
Figure 12:
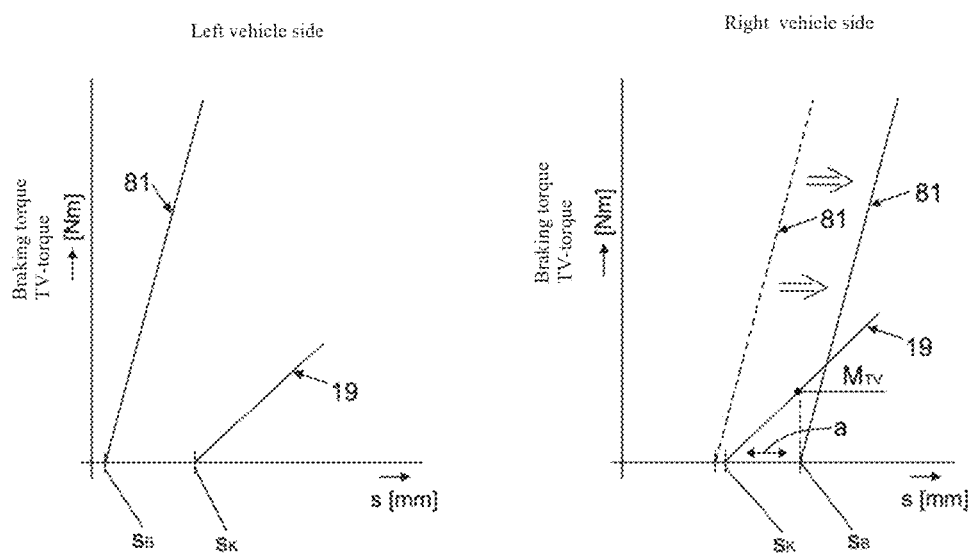
FIG. 12 shows braking characteristics of the multi-disk clutch and the multi-disk brake on both sides of the vehicle during non uniform braking.

FIG. 12 describes an uneven braking operation in which the control unit 8 applies brake pressure to the hydraulic cylinder 15 on the right-hand side of the vehicle, for example, while the left-hand side of the vehicle is not subjected to brake pressure. During the closing stroke of the right ring piston 57, both the disk pack of the right multi-disk clutch 19 is pressed against the axial stop 87 and the disk pack of the right multi-disk brake 81 is pressed against the pressure rod 89 acting as an axial stop. As a result, the pressure rod 89 is adjusted by the pressure rod axial travel Δs towards the left side of the vehicle. Therefore, the braking characteristic of the multi-disk brake 81 is shifted, as indicated by double arrows in the right-hand diagram of FIG. 12. This results in a multi-disk brake clearance $s_B$ on the right-hand side of the vehicle which is increased by the pressure rod axial travel Δs, compared to the braking case with uniform braking (FIG. 11). Preferably, the multi-disk brake clearance $s_B$ is dimensioned larger than the multi-disk clutch clearance $s_K$ by an additional value a. In this way, it is ensured that the braking torque $M_R$ that can be applied on the right-hand side of the vehicle is first guided via the right-hand superposition gear 45 to the electric machine EM and is recuperated there. If the right-hand multi-disk brake clearance $s_B$ is used up during the further braking process, the multi-disk brake 81 also comes into braking engagement. In the right diagram of FIG. 12 a braking torque $M_{TV}$ is entered. When the kiss point of the right-hand multi-disk brake 81 is reached, i.e. when the right-hand multi-disk brake clearance $s_B$ is used up, the braking torque $M_{TV}$ is transmitted via the right-hand superposition gear 45 in the direction of the electric machine EM.

On the opposite left-hand side of the vehicle, which is not subjected to brake pressure, the following constellation arises according to the left-hand diagram in FIG. 12: The multi-disk brake clearance $s_B$ available here is reduced due to the pressure rod adjustment to the left. The multi-disk brake clearance $s_B$ is smaller than the multi-disk clutch clearance $s_K$ so that actuation of the multi-disk clutch 19 on the side of the vehicle not subjected to brake pressure is excluded.

It should be emphasized that the invention is not limited to the embodiment of FIGS. 10 to 12. Rather, the multi-disk brakes 81, the structure and functioning of which are explained with reference to FIGS. 10 to 12, can also be installed in the comparative example of FIGS. 1 to 4 and in the comparative example of FIGS. 5 to 9.

LIST OF REFERENCE NUMERALS 1 vehicle wheel brakes
3 brake caliper
5 brake disk
7 hydraulic lines
9 hydraulic valve
11 partial line
12 drive unit
13 partial line
14 transmission
15 hydraulic cylinder of the multi-disk clutches 19
19 multi-disk clutches
23 flange shafts
27 electric machine shaft
29 countershaft spur gear stage
31 intermediate shaft
33 fixed gear
35 fixed gear
37 additional spur gear stage
39 axle differential
41 fixed gear
43 axle differential gear
45 superposition gear
45*l* left-hand superposition gear
45*r* right-hand superposition gear
49 idler gear
51 intermediate shaft fixed gear
53 outer disk carrier
55 inner disk carrier
57 ring piston
58 separating clutch 58r right-hand separating clutch
58l left-hand separating clutch
59 differential side partial shaft
61 wheel-side partial shaft
63 sliding sleeve
65 sliding sleeve internal gearing
66 external gearing of the differential-side partial shaft
67 external gearing of the wheel-side partial shaft
69 preload spring
73 sliding sleeve actuator
75 connecting line
77 tooth flank
81 multi-disk brake
82 radial connecting flange
83 inner disk carrier
85 outer disk carrier
87 axial stop of the multi-disk clutch
89 pressure rod
91 movement stops
HL, HR vehicle wheels
8 control unit
EM electric machine
$M_L$ on the left rear wheel HL deductible braking torque
$M_R$ on the right rear wheel HR deductible braking torque
$M_1$ superposition torque
$M_2$ differential torque
$F_V$ preload spring force
$F_A$ actuator force
$F_{ax}$ axial force component
$F_R$ resulting force
$n_{ref}$ reference speed
$s_B$ multi-disk brake clearance
$s_K$ multi-disk clutch clearance
Δs pressure rod axial travel
a additional dimension
L left side of vehicle
R right side of vehicle

The invention claimed is:

1. A drive device for a vehicle axle of a two-track vehicle, which has an axle differential, the input side of which is drivingly connected to an electric machine and the output sides of which drive on flange shafts leading to two vehicle wheels, wherein the vehicle axle has a superposition gear with a multi-disk clutch on each side of the vehicle, by which the electric machine can be connected directly to each vehicle wheel flange shaft by bridging the axle differential, wherein the multi-disk clutches can be controlled by a control unit for a redistribution of braking torque between the vehicle sides in a recuperation mode of the electric machine, wherein a multi-disk brake acting as a vehicle wheel brake is assigned on each side of the vehicle of the multi-disk clutch, by which vehicle braking can be carried out alternatively or in addition to the multi-disk clutch;

wherein, on each side of the vehicle, both the multi-disk clutch and the multi-disk brake can be actuated via a common hydraulic cylinder which is connected to the control unit via exactly one hydraulic line, and in that the hydraulic cylinder builds up a hydraulic pressure when controlled by the control unit, with which a pressure element presses both against a disk pack of the multi-disk clutch and against a disk pack of the multi-disk brake.

2. The drive device according to claim 1, wherein, on each side of the vehicle, the pressure element, starting from a non-actuated state, presses the disk pack of the multi-disk clutch against an axial stop via a clearance until the kiss point is reached, and in that in particular the clearance is unchangeable regardless of braking, that is to say in the event of uniform braking or uneven braking on each side of the vehicle.

3. The drive device according to claim 2, wherein, on each side of the vehicle, the pressure element, starting from the non-actuated state, presses the disk pack of the multi-disk brake against an axial stop via a clearance until the kiss point is reached, and in that the clearance varies depending on braking by axial adjustment of the axial stop.

4. The drive device according to claim 3, wherein, with the uniform braking on both sides of the vehicle, the multi-disk brake clearance is smaller than the multi-disk clutch clearance, so that, during a closing stroke of the pressure element, the multi-disk brake first comes into braking engagement and only later in the process does the multi-disk clutch come into braking engagement.

5. The drive device according to claim 4, wherein, with the uniform braking on both sides of the vehicle, the multi-disk brake clearance is smaller than the multi-disk clutch clearance, so that, during the closing stroke of the pressure element, the multi-disk clutch of the vehicle side which is controlled with a higher braking pressure by the control unit initially comes into braking engagement and only later in the process the multi-disk brake comes into braking engagement.

6. The drive device according to claim 4, wherein the axial stop of the multi-disk brake is a pressure rod, and in that the pressure rod acts on both sides of the vehicle as the axial stop which is axially adjustable between movement stops by a pressure rod axial path.

7. The drive device according to claim 3, wherein, with the uniform braking on both sides of the vehicle, the multi-disk brake clearance is smaller than the multi-disk clutch clearance, so that, during the closing stroke of the pressure element, the multi-disk clutch of the vehicle side which is controlled with a higher braking pressure by the control unit initially comes into braking engagement and only later in the process the multi-disk brake comes into braking engagement.

8. The drive device according to claim 7, wherein the axial stop of the multi-disk brake is a pressure rod, and in that the pressure rod acts on both sides of the vehicle as the axial stop which is axially adjustable between movement stops by a pressure rod axial path.

9. The drive device according to claim 3, wherein the axial stop of the multi-disk brake is a pressure rod, and in that the pressure rod acts on both sides of the vehicle as the axial stop which is axially adjustable between movement stops by a pressure rod axial path.

10. The drive device according to claim 9, wherein, with the uneven braking on a side of the vehicle subjected to a greater braking pressure, during a closing stroke of the pressure element, the disk pack of the multi-disk brake adjusts the pressure rod by a pressure rod axial travel in a direction of a counterpressure vehicle side, so that the available multi-disk brake clearance increases by the pressure rod axial travel in comparison to braking with uniform braking, and in that the multi-disk brake clearance is dimensioned to be an additional dimension larger than the multi-disk clutch clearance, so that, during the closing stroke of the pressure element, the multi-disk clutch first comes into braking engagement and only later in the process does the multi-disk brake come into braking engagement.

11. The drive device according to claim 10, wherein, with the uneven braking on the counterpressure side of the vehicle, the multi-disk brake clearance is reduced due to the pressure rod adjustment, and in that the multi-disk brake clearance is smaller than the multi-disk clutch clearance, so that actuation of the multi-disk clutch on the opposite side of the vehicle is excluded.

\* \* \* \* \*